United States Patent
Saini

(10) Patent No.: US 8,672,228 B1
(45) Date of Patent: Mar. 18, 2014

(54) AUTOMATIC CONNECTORS

(75) Inventor: Amrinder Pal Singh Saini, Union City, CA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/053,597

(22) Filed: Mar. 22, 2011

(51) Int. Cl.
- G06K 7/00 (2006.01)
- H01R 11/30 (2006.01)
- H01R 13/60 (2006.01)

(52) U.S. Cl.
USPC .......................... 235/486; 439/39

(58) Field of Classification Search
USPC ........................... 235/486; 439/39
See application file for complete search history.

(56) References Cited

U.S. PATENT DOCUMENTS

| | | | | |
|---|---|---|---|---|
| 5,931,683 A | * | 8/1999 | Pinel | 439/39 |
| 6,213,783 B1 | * | 4/2001 | Kankkunen | 439/39 |
| 7,311,526 B2 | | 12/2007 | Rohrbach et al. | |
| 8,022,664 B2 | * | 9/2011 | Shu | 320/107 |
| 8,272,876 B2 | * | 9/2012 | Schultz | 439/38 |
| 2004/0029405 A1 | * | 2/2004 | Neidlein | 439/38 |
| 2009/0098781 A1 | * | 4/2009 | Volka | 439/886 |
| 2009/0269943 A1 | * | 10/2009 | Palli et al. | 439/39 |
| 2010/0080563 A1 | * | 4/2010 | DiFonzo et al. | 398/115 |
| 2010/0240229 A1 | * | 9/2010 | Firman et al. | 439/34 |

* cited by examiner

*Primary Examiner* — Thien M Le
*Assistant Examiner* — Toan Ly
(74) *Attorney, Agent, or Firm* — Lee & Hayes, PLLC

(57) ABSTRACT

Some implementations provide a connector element that may be movable from a retracted position within a cavity to an extended position for contacting an external contact element that may be positioned proximate to an exterior end of the cavity. In some implementations, at least one of the external contact element or the connector element may include a magnet for causing the connector element to extend from the retracted position into contact with the external contact element for forming an electrical connection. In some implementations, a mechanical actuator may be provided for extending the connector element into contact with the external contact element. In some implementations, an actuator having a motive element may extend the connector element into contact with the external contact element based on a detected proximity or an identification of an accessory associated with the external contact element. Some implementations may also include an optical connection.

37 Claims, 12 Drawing Sheets

AUTOMATIC CONNECTORS

BACKGROUND

Sometimes an electronic device may be connected through an electrical connection to another device, accessory, peripheral, cable, power source, or the like. Such an electrical connection may enable the transfer of power and/or data between the device and the connected component. For example, such connections may enable the device to provide power to another device, such as an accessory, peripheral, or the like. Additionally, such connections may enable a device to receive power from a power source, such as a power adaptor, docking station, external battery, etc. Further, such connections can enable the transfer of data between the device and other devices, accessories, peripherals, and so forth. Examples of typical connectors for forming these connections include plugs, ports, sockets, and the like; however, many conventional connectors are large and bulky, or can be difficult for a user to easily connect and disconnect.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Electrical Connections

Figure 1:
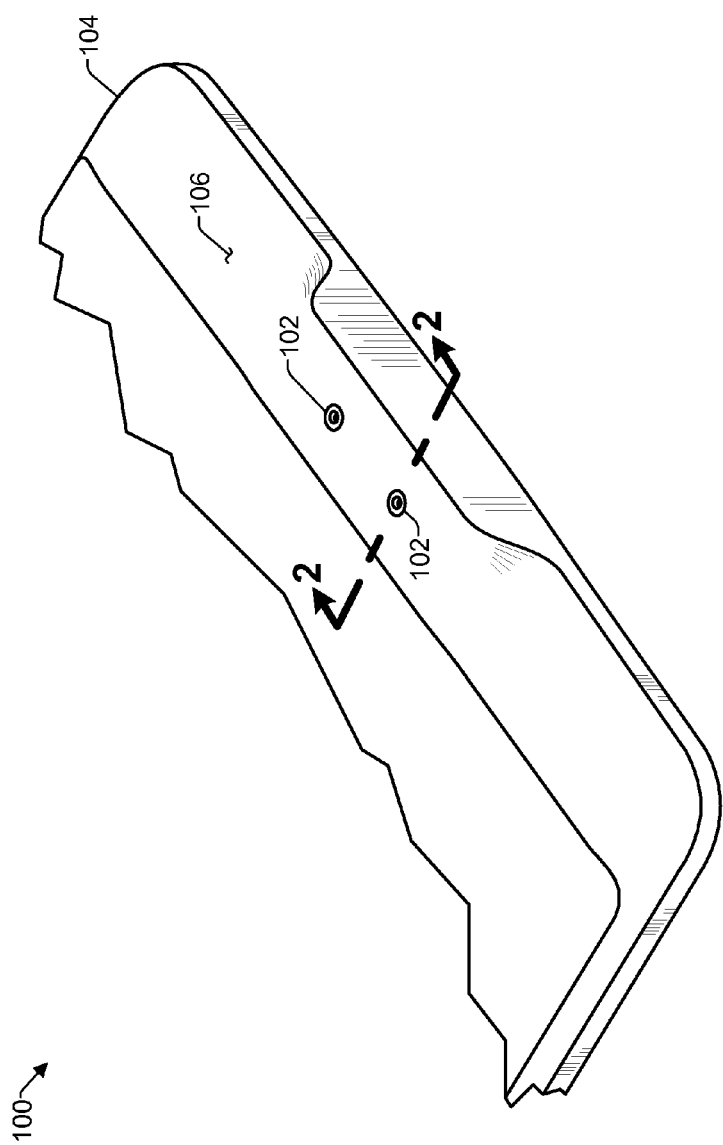
FIG. 1 is a perspective view of an electronic device having an electrical connector according to some implementations.

This disclosure includes arrangements and techniques for forming an electrical connection and/or and optical connection. In some implementations, the electrical connection may be formed automatically when an external contact element is brought into proximity to a connector element. In some instances, the automatic connection may be performed passively, such that the device does not actively perform an action or interaction to make the connection. In other instances, the device may actively perform the automatic connection, such as in response to the device detecting the presence of another component with which the connection can be made. Further, in some instances, the device may detect the type of connection to be made, and make the appropriate connection for transferring at least one of power or data.

Some implementations include at least one electrical connector having a connector element that is recessed in a cavity when in an unconnected condition. The connector element may automatically move or extend to form an electrical connection with an external contact element when the external contact element is placed into near proximity to the connector. Accordingly, the connector element may be movable within the cavity from a retracted position to the extended position to make the electrical connection with the external contact element.

A variety of different arrangements and techniques are disclosed herein for extending the connector element. In some instances, the connector element extends under the influence of a magnetic force. For example, at least one of the external contact element or the connector element may include a magnet for drawing the connector element into contact with the external contact element. In some instances, a mechanical actuator may extend the connector element from the retracted position to the extended position when an accessory or contact element is placed into proximity to the connector. In yet other instances, an active motive element may extend the connector element from the retracted position to the extended position to form the connection. For example, in some active implementations, the motive element may be activated to extend the connector element in response to detection of the presence of an external contact, accessory, or the like. Various types of sensors and motive elements may be employed for extending the connector element into contact with the external contact element.

In some implementations, the techniques and arrangements described herein may apply to connectors for use with a variety of different types of electronic devices, such as eBook reader devices, cellular telephones and smart phones, tablet computers, portable media players, netbooks, desktop computers, laptops, personal digital assistants, televisions, set top boxes, gaming consoles and devices, optical disc players, digital video recorders, and other types of devices that may connect to other devices, accessories, peripherals, connectors, cables, components, or the like. Examples of such accessories may include device cases, device covers, reading lights, docking stations, display devices, antennas, supplemental antennas, antenna boosters, power adaptors, external or supplemental batteries, and the like. Further, implementations of the connectors herein are not limited to use with electronic devices and can apply to any electrical connection between two components, devices, circuits, apparatuses, cables, or any combination thereof.

Additionally, in some implementations, an optical connector may be provided in place of or in addition to the electrical connectors herein. In some implementations, the optical connector may enable the transfer of optical signals between an electronic device and another electronic device, accessory, component, circuit, or the like. For example, in some implementations, one or more optical connectors may be provided for transferring data, while a pair of electrical connectors may be provided for transferring electrical power.

The foregoing discussion is provided for the reader's convenience and is not intended to limit the scope of the claims or the disclosure herein. Furthermore, the arrangements and techniques described above and below may be implemented in a number of ways and in a number of contexts. Several example implementations and contexts are provided with reference to the figures, as described below in more detail. However, the following implementations and contexts are but a few of many.

Example Connector

FIG. 1 is a perspective view of an example electronic device 100 having at least one an electrical connector 102 according to some implementations. In the illustrated example, the electronic device 100 includes a pair of connectors 102, although in other implementations, a single connector 102 or more than two connectors 102 may be provided. The electronic device 100 may be any type of electronic device that is connectable to an accessory, peripheral, cable, power supply, and so forth. In addition, while the connectors 102 are shown adjacent to one another at one example location on the device 100, the connectors 102 may be located on any part of the device 100, such as the side, top, bottom, edges, and so forth. Further, the connectors 102 need not be located adjacent to one another. For example, one connector 102 may be located on a first side or surface of the device 100, while one or more other connectors 102 may be located on a different second side or surface of the device 100. Numerous other possible configurations and locations for the connectors herein will be apparent to those of skill in the art in light of this disclosure.

The electronic device 100 may include a device housing 104 having a device surface 106. In some implementations, the electrical connectors 102 include connector elements (not shown in FIG. 1) that are recessed below the device surface 106. For example, because the connector elements of the electrical connectors 102 are recessed below the device surface 106, unintentional contact with the connector elements may be avoided. For example, in the case that the connectors 102 are used to transfer power to an accessory, if the connectors 102 had exposed connector elements, an electrical short or power drain might easily occur. Furthermore, in electronic devices such as device 100, the size of the connectors 102 is a consideration. Accordingly, implementations herein enable connectors 102 to have a relatively large electrical contact area for forming a good electrical connection, while taking up less space in the device 100 than many conventional types of connectors.

Figure 2:
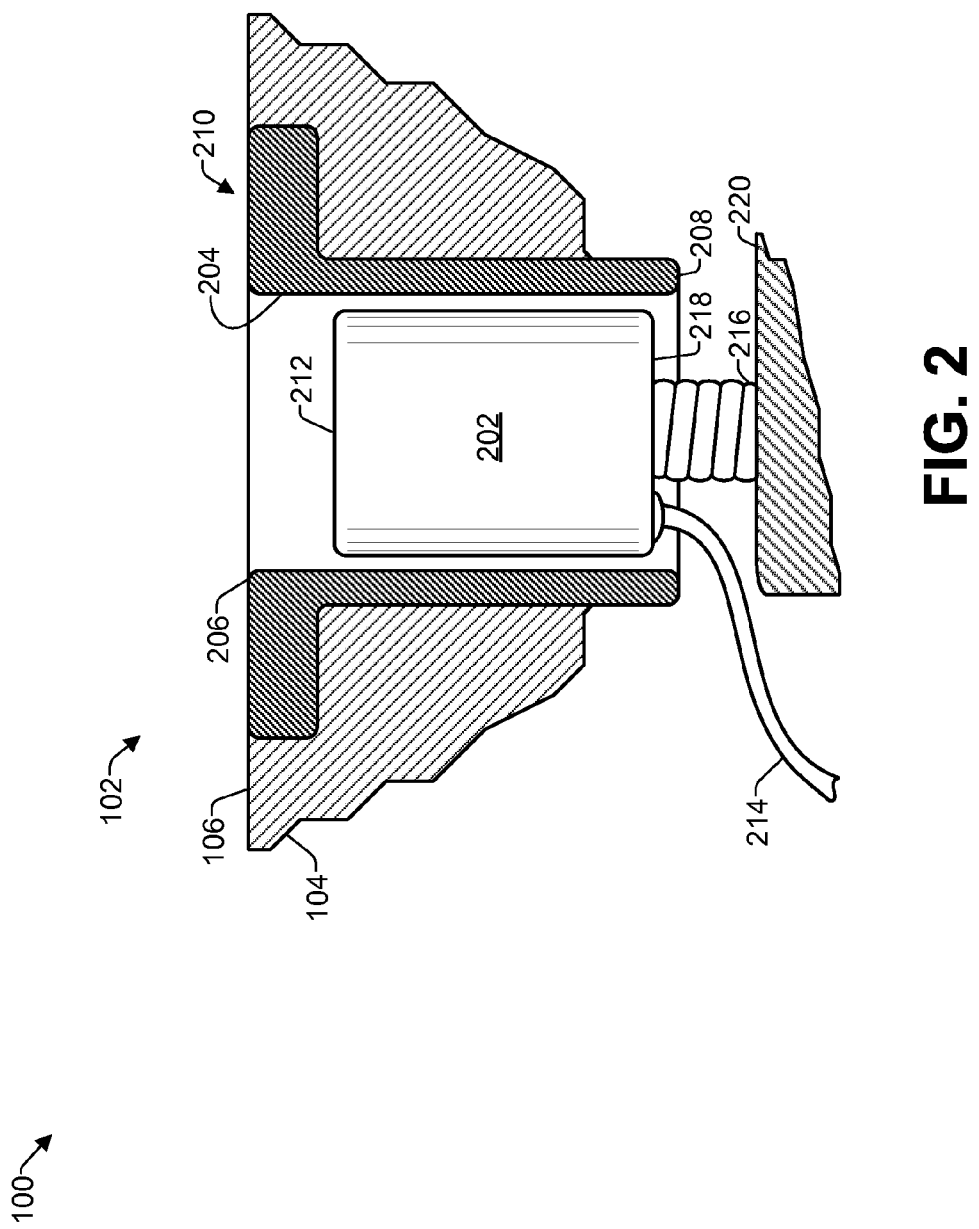
FIG. 2 is a cross-sectional elevation view of the electrical connector of FIG. 1, as taken along line 2-2 of FIG. 1.

FIG. 2 is a cross-sectional elevation view of the electrical connector 102 of FIG. 1, as taken along line 2-2 of FIG. 1. The electrical connector 102 may include a connector element 202 able to move within a hollow bore or cavity 204. The cavity 204 includes an exterior end 206 that provides an opening through the device surface 106. The cavity 204 further includes an interior end 208 that may be open or closed. Thus, the cavity 204 may be formed within a connector housing or enclosure 210 for containing the connector element 202. In some implementations, the enclosure 210 may be constructed from, or may include a lining of, a lubricious non-conducting polymer or other non-conductive material. Examples of suitable enclosure materials include polyoxymethylene, polytetrafluoroethylene, or any of numerous other suitable polymeric or non-polymeric materials. Furthermore, in some implementations, the enclosure 210 may be integrally molded or formed as part of the device housing 104. For example, in some implementations, if the device housing 104 is constructed from a nonconductive material, then a simple opening or hole formed in the device housing 104 may serve as the cavity 204, and thus, the material of the device housing 104 may form the connector enclosure 210.

Connector element 202 is moveable within cavity 204 between a retracted position, as illustrated in FIG. 2, and an extended position in which connector element 202 is extended toward the exterior end 206 of cavity 204. Connector element 202 includes a contact surface 212 for making an electrical connection, as described additionally below. At least the contact surface 212 of connector element 202 may be formed of, or plated with, a conductive material, such as gold, copper, aluminum, or the like. An electrical lead 214 may be in electrical communication with contact surface 212, and may place connector element 202 into electrical communication with an electrical circuit, terminal, power source, or the like (not shown).

In some implementations, the exterior end 206 of the cavity 204 and/or the enclosure 210 may be generally flush with the device surface 106. In other implementations, the enclosure 210 and the exterior end 206 may extend beyond the device surface 106, or may be recessed below the device surface 106. Further, in some implementations, in the retracted position, the connector element 202 may be retracted a sufficient distance away from the exterior end 206 to avoid unintentional external contact that could cause an electrical short. Thus, in the retracted position, the contact surface 212 of the connector element 202 may be located a predetermined distance from the exterior end of the cavity 204.

The connector 102 may also include a retaining element 216 for retaining the connector element 202 in the retracted position. In some implementations, retaining element 216 may be a spring connected to a bottom 218 of the connector element 202 and also connected to a fixed base 220, which may be part of, or attached to, device housing 104. For example, retaining element 216 retains connector element 202 within the cavity 204 in the retracted position a predetermined distance from the exterior end 206. Retaining element 216 may allow the connector element 202 to move toward the exterior end 204 of connector enclosure 210 for assuming an extended position when forming an electrical connection. Additionally, when the electrical connection is severed, the retaining element 216 may retract the connector element 202 back toward the interior end 208 to assume the retracted position. Further, the retaining element 216 is not limited to being a spring, but may be a magnet, an elastic element, an active motive element, or other suitable retaining element.

Magnetic Connector Activation

Figure 3:
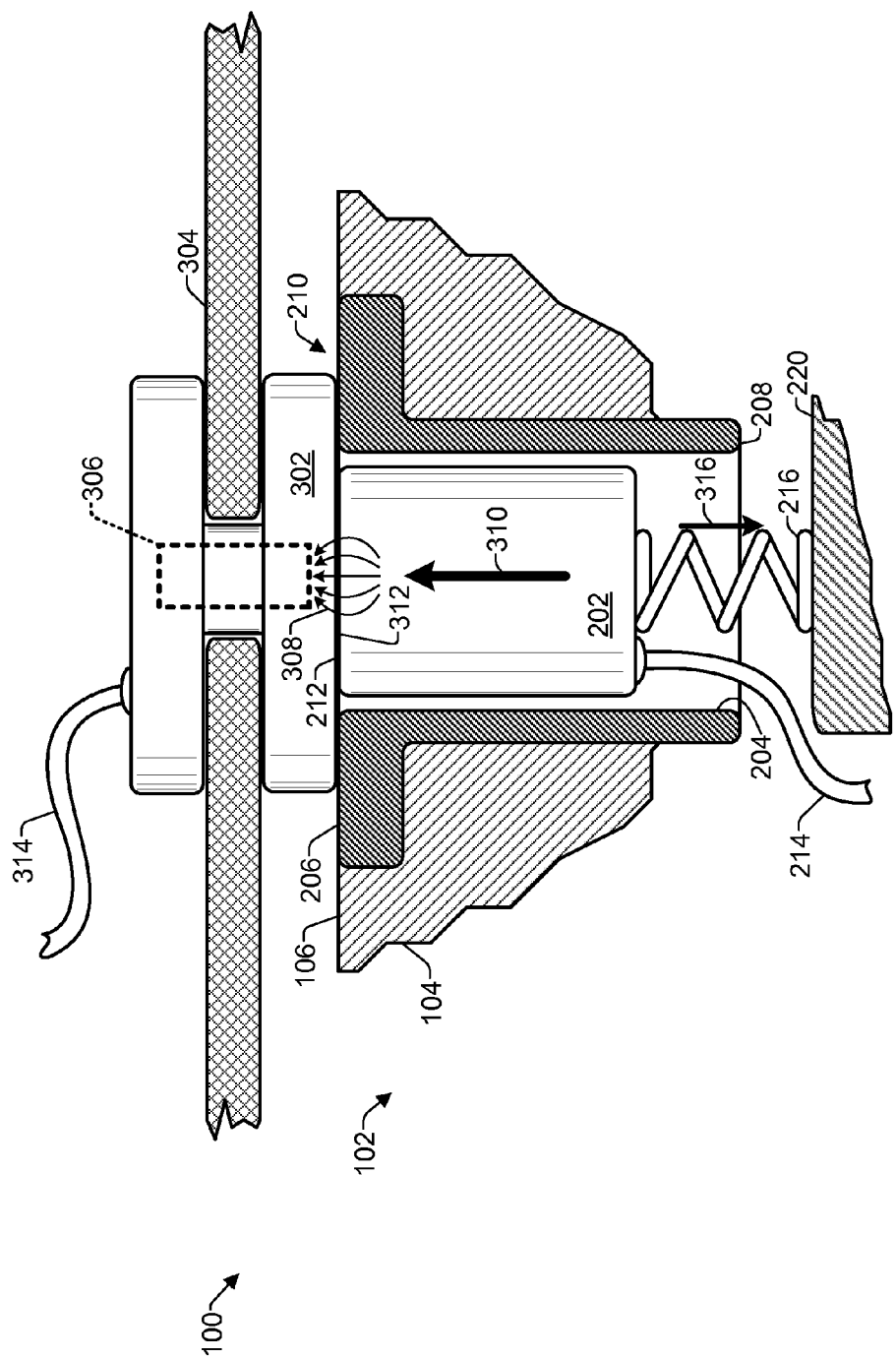
FIG. 3 illustrates the electrical connector of FIG. 2 in an extended position due to magnetic attraction according to some implementations.

FIG. 3 illustrates the electrical connector of FIG. 2 with the connector element 202 in an extended position and in electrical connection with an external contact element 302 according to some implementations. For example, the external contact element 302 may be mounted on an accessory, peripheral, plug, cable connector, or other connectable component or member. In the illustrated example, external contact element 302 is mounted in an accessory wall 304, and has been brought into close proximity or contact with the exterior end 206 of the connector enclosure 210. The external contact element 302 may include a magnetic portion 306, such as a permanent magnet of a rare-earth material, or other suitable magnetic material. Additionally, in this example, connector element 202 may include, or may be constructed from, at least in part, a ferromagnetic material, such as iron, nickel, cobalt, or the like. For example, in some implementations, connector element 202 may include a ferromagnetic core plated at least on contact surface 212 with a conductive non-corrosive material such as gold, copper, or the like, as discussed above.

When the external contact element 302 is brought into close proximity to the exterior end 206 of connector enclosure 210, the magnetic portion 306 of the external contact element 302 exerts a magnetic influence or magnetic field 308 on the connector element 202 to draw the connector element 202 into contact with the external contact element 302. Thus, as indicated by arrow 310, connector element 202 is drawn from the retracted position illustrated in FIG. 2 into the extended position illustrated in FIG. 3 so that the contact surface 212 of the connector element 202 is drawn into contact with an external contact surface 312 of the external contact element 302. Accordingly, an electrical connection is formed between the connector element 202 and the external contact element 302. External contact element 302 may be plated or coated with a highly conductive material, such as gold, copper, aluminum, or the like, at least at contact surface 312. Further, an electrical lead 314 may be in electrical communication with contact surface 312, and may place external contact element 302 into electrical communication with a circuit, terminal, cable, or other electrical element. When the external contact element 302 is removed from proximity to the exterior end 206 of connector enclosure 210, the electrical connection is severed, and the retaining element 216 may retract the connector element 202 back to the retracted configuration illustrated in FIG. 2, as indicated by arrow 316.

Additionally, in some implementations, connector element 202 may include the magnetic portion 306, and external contact element 302 may be constructed, at least in part from a ferromagnetic material. Further, in some implementations, both the connector element 202 and the external contact element 302 may include magnetic portions 306. In addition, as mentioned above, in some implementations, the retaining element 216 may also be a permanent magnet, an electromagnet, or the like. For example, rather than being a spring, the retaining element 216 may be a magnet that exerts a magnetic field that is an order of magnitude less that the magnetic field 308 exerted by the magnetic portion 306 of the external contact element 302. Additionally, in some implementations, the connector contact surface 212 may be hemispherical to increase the contact area, and the external contact element 302 may have a matching concave contact area as contact area 312. In some implementations, having a hemispherical contact area in combination with the magnetic attractive force of magnetic portion 306 can cause the external contact element 302 to automatically center on the connector element 202 when forming the electrical connection. Further, while the connector element is illustrated as being cylindrical in this example, in other implementations, the connector element may be other suitable shapes, such as spherical, box-shaped, or the like. Other variations will also be apparent to those of skill in the art in view of the disclosure herein.

Figure 4:
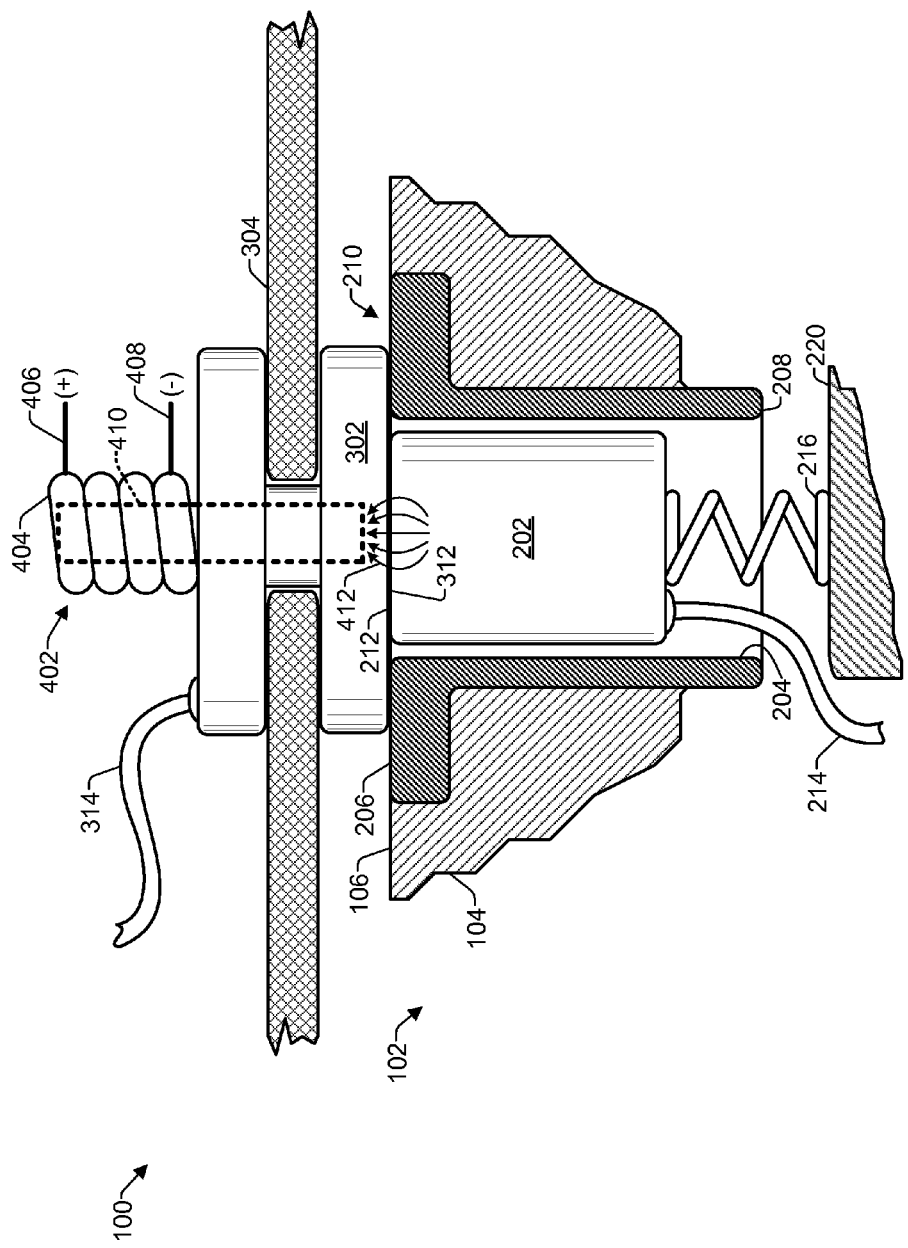
FIG. 4 illustrates the electrical connector of FIG. 2 in an extended position due to magnetic attraction to an electromagnet according to some implementations.

FIG. 4 illustrates an alternative arrangement that includes an electromagnet 402, rather than a permanent magnetic portion 306, according to some implementations. For example, the electromagnet 402 may include a coil 404, a positive the lead 406, a negative the lead 408, and a ferromagnetic core 410. When a current is passed through the coil 404, the ferromagnetic core 410 creates a magnetic field 412 that draws the connector element 202 into the extended position, so that the contact surface 212 is brought into contact with the contact surface 312, thereby forming an electrical connection. Removal of the current and/or the external contact element 302 results in the connector element 202 returning to the retracted position, as described above.

Mechanical Connector Activation

Figure 5:
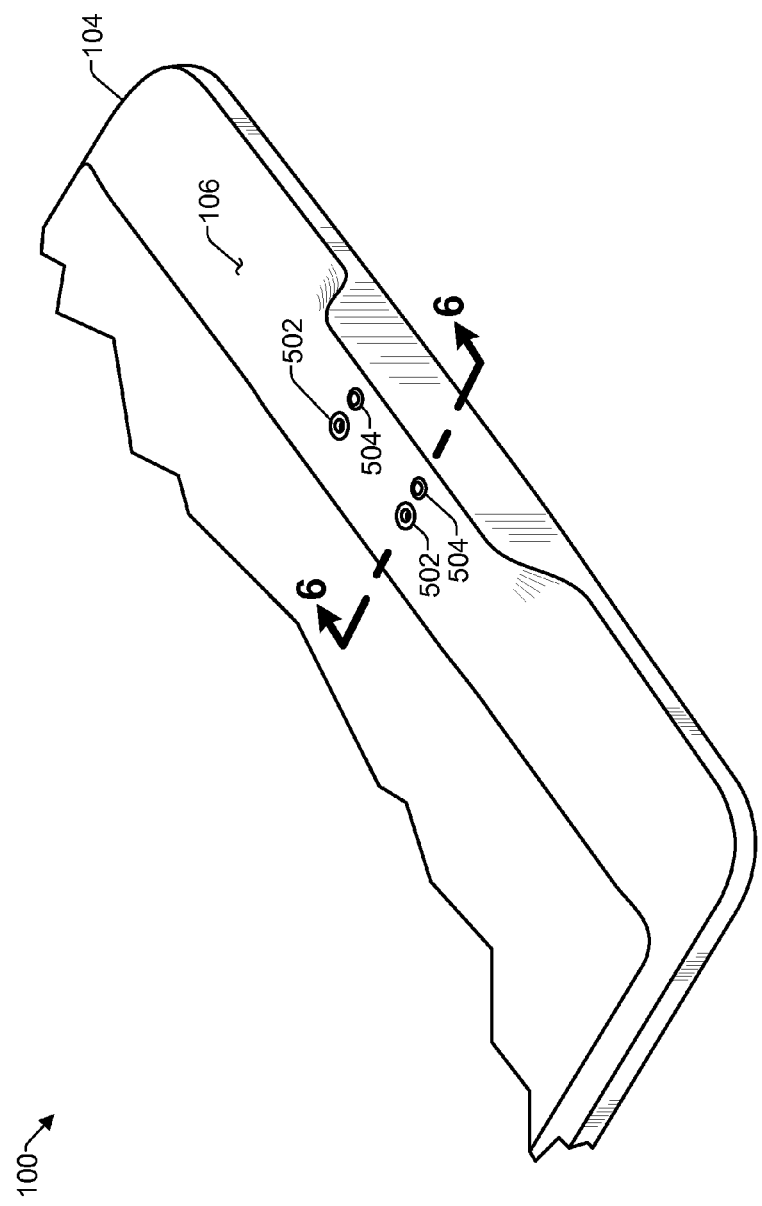
FIG. 5 is a perspective view of an electronic device having a mechanically activated electrical connector according to some implementations.

FIG. 5 illustrates a perspective view of the electronic device 100 having mechanically activated electrical connectors 502 according to some implementations. The electrical connectors 502 may be similar in part to the electrical connectors 102 described above. Thus, the connectors 502 include items and features similar to connectors 102 described above, and similar or identical items or features are given the same reference numbers as those items and features described above. In the illustrated example, electrical connectors 502 include mechanical actuators 504 for extending the connector elements 202. For example, when an accessory, component, or the like, having external contact elements is position over the connectors 502, the mechanical actuators may be depressed, causing the connector elements 202 to extend outward, as described additionally below with reference to FIG. 6.

Figure 6:
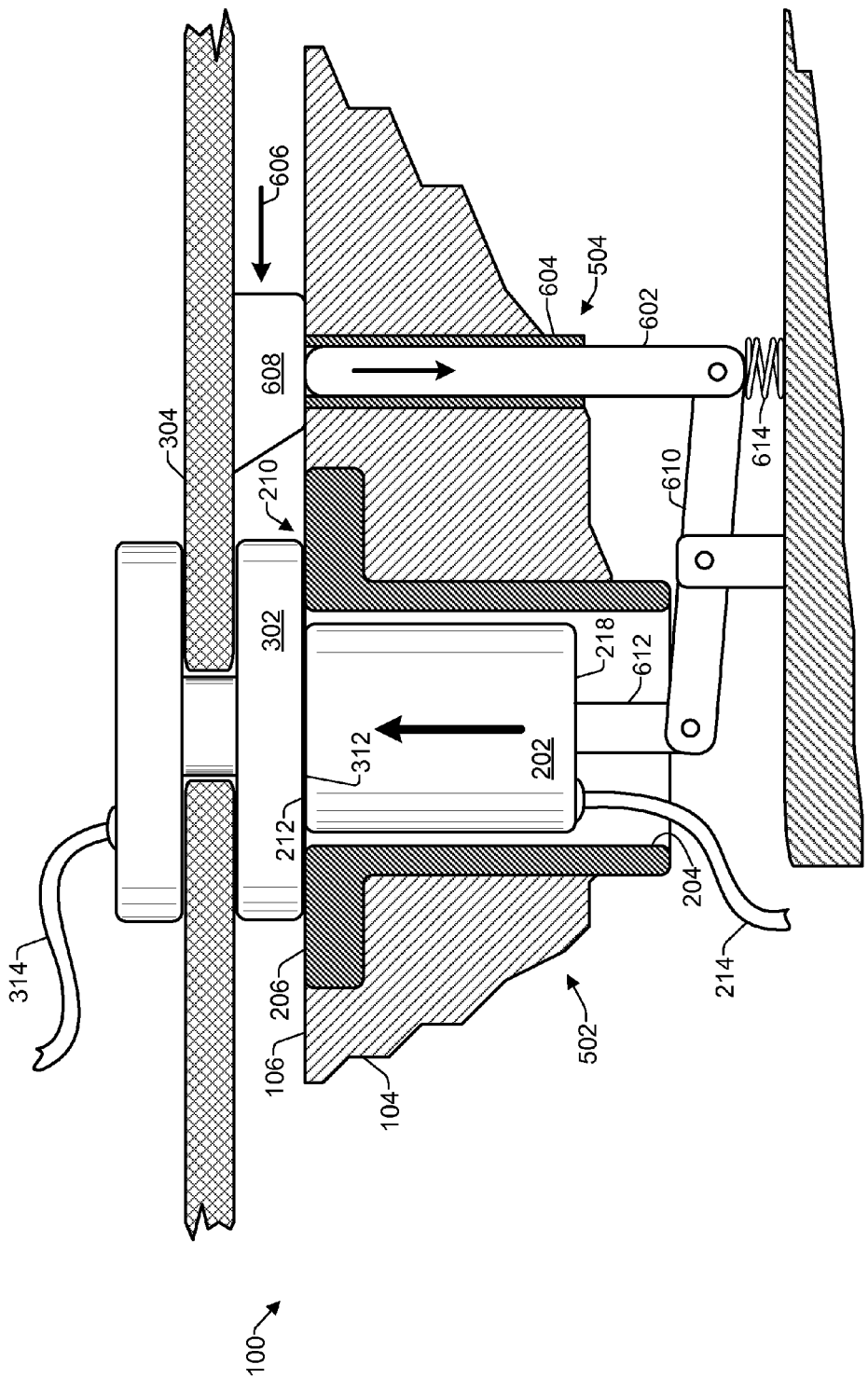
FIG. 6 is a cross-sectional elevation view of the electrical connector of FIG. 5, as taken along line 6-6 of FIG. 5.

FIG. 6 is a cross-sectional elevation view of an electrical connector 502 of FIG. 5, as taken along line 6-6 of FIG. 5. Connector 502 includes the mechanical actuator 504. The mechanical actuator 504 includes a linkage 602 movable within a hole or liner 604. For example, liner 604 may be constructed of a lubricious material similar to those described above for enclosure 210. In some implementations, the external contact element 302 may be positioned over the connector 502 such as by sliding or otherwise placing the external contact element 302 into position proximate to cavity 204, as indicated by arrow 606. Further, in these implementations, external contact element 302 may not include the magnetic portion 306. A depression element 608 may be associated with the external contact element 302, such as by being attached to the accessory wall 304, or may be part of or contiguous with contact element 302. The depression element 608 may press down on linkage 602 when the contact element 302 is positioned over the connector 502. Pressing down on the linkage 602 may cause the linkage to rotate a rocker 610 that is connected to a link 612 connected to the bottom 218 of the connector element 202. Accordingly, placement of the external contact element 302 into position over the connector 502 results in the mechanical extension of the connector element 202 into contact with the external contact element 302. Subsequent removal of the external contact element 302 and the depression element 608 results in the retraction of the connector element 202 due to an expansive force of a retraction member 614, such as a spring or other suitable type of retraction member. Additionally, while an individual mechanical actuator 504 is illustrated in this example for an individual connector element 202, in other implementations, a mechanical actuator 504 may serve as an actuator for multiple connector elements 202. Furthermore, the illustrated example is just one possible example of a mechanical activation arrangement. Numerous other possible arrangements and variations will be apparent to those of skill in the art in view of the disclosure herein.

Data and Power Transfer

Figure 7:
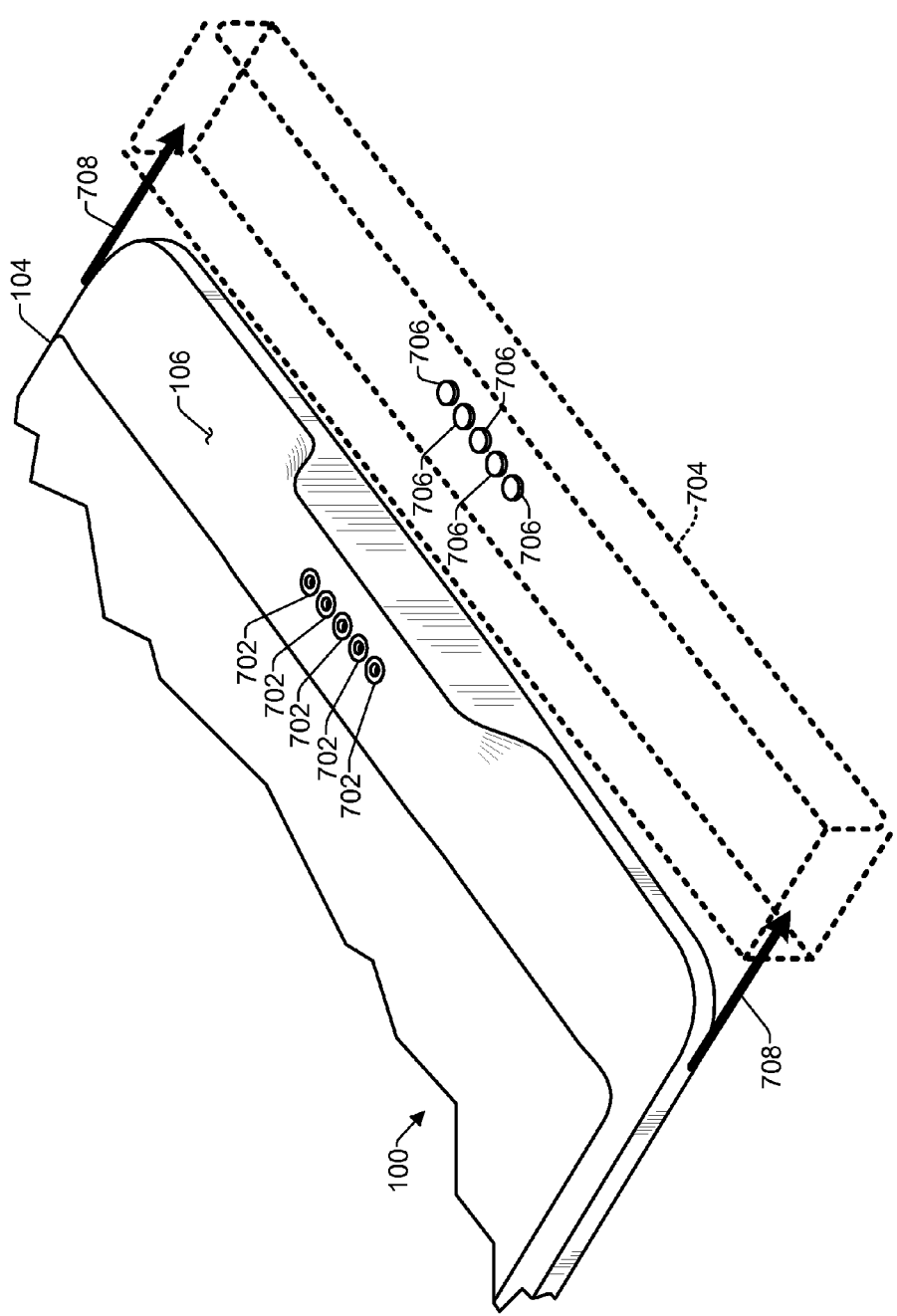
FIG. 7 is a perspective view of an electronic device having a plurality of electrical connectors capable of transferring power and/or data according to some implementations.

FIG. 7 illustrates another example configuration of the electrical device 100 having a plurality of connectors 702. In some implementations, connectors 702 may correspond to the connectors 102 or 502 described above, or other connectors 802 described below. In some implementations, two of the connectors 702 may be used to transfer power, and one or more other connectors 702 may be used to transfer data. Further, in some implementations, only some of the connector elements of connectors 702 may be extended, as needed.

In the illustrated example, the device 100 may be mated with an accessory 704 having a plurality of external contact elements 706 that may correspond to external contact elements 302 described above, with or without the magnetic portion 306, the electromagnet 402 and/or the depression element 608. For example, the device 100 may slide into, snap onto, or otherwise engage with the accessory 704, as indicated by arrows 708. Thus, fitting the device 100 within the accessory 704 may automatically position the external contact elements over a desired electrical connector 702. Examples of some possible accessories 704 may include peripherals, device covers, reading lights, docking stations, display devices, antennas, supplemental antennas, antenna boosters, power adaptors, supplemental batteries, and the like.

In some implementations, if the device 100 is connected to an accessory 704 that shares data with the device 100, but that includes its own power source, then only one or more connectors 702 needed for transferring data may be extended. Similarly, if an accessory 704 is connected that provides or receives power, then only two connectors 702 that transfer power may be extended. In the magnetic implementations, external contact elements 706 may correspond to magnetic external contact elements 302. Thus, if only power is to be transferred, then only two external contact elements 706 might be provided, with those two external contact elements being positioned to interact with only connectors 702 that are configured to transfer power. Additionally, in the implementations described below, various motive elements, linkages, or the like, may be activated or actuated to extend connector elements of one or more selected connectors 702.

Active Connectors

Figure 8:
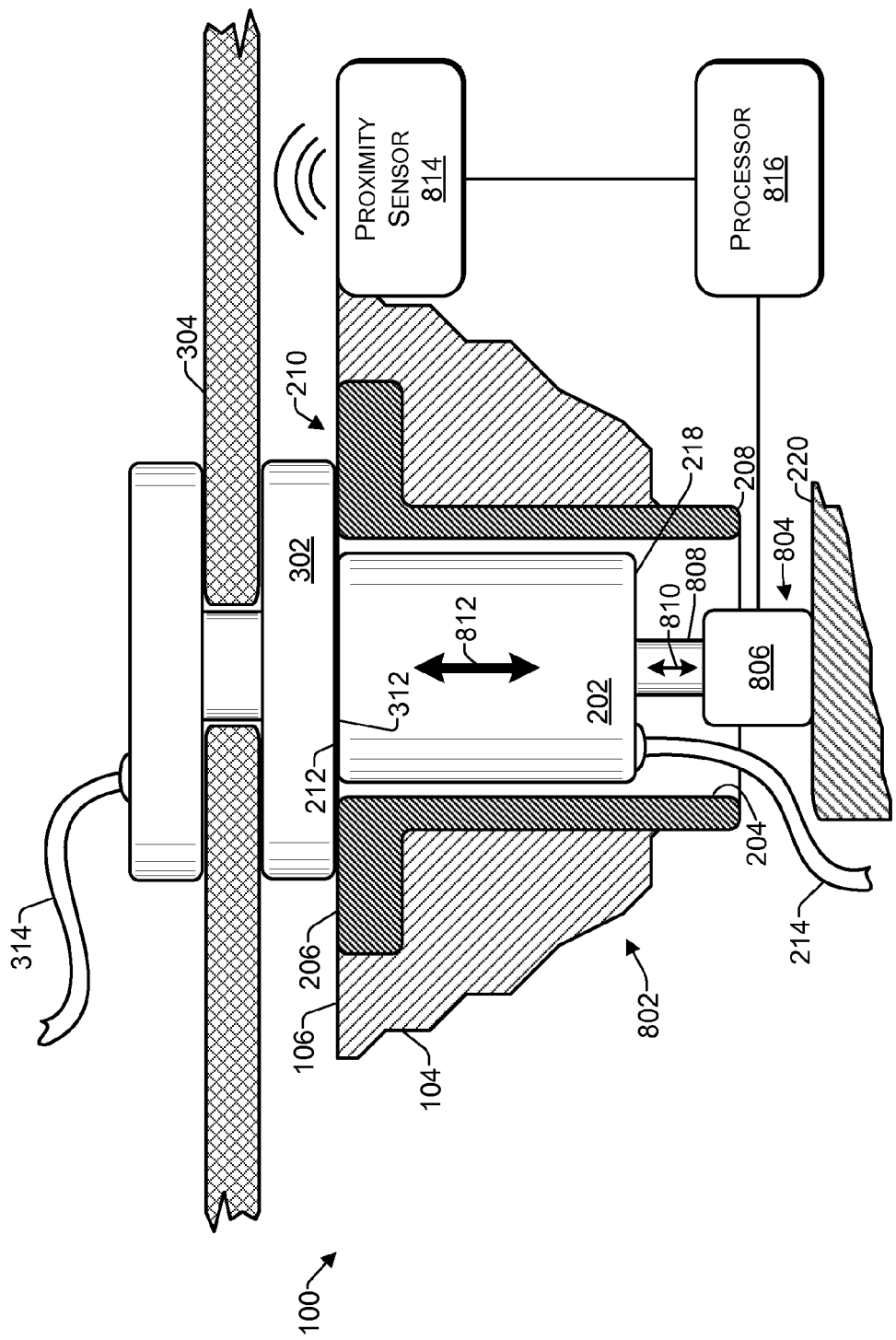
FIG. 8 is a cross-sectional elevation view of an electrical connector including an active extension arrangement and a proximity sensor according to some implementations.

FIG. 8 is a cross-sectional elevation view of an example implementation of an electrical connector 802 including an active extension arrangement. In the illustrated example, the connector 802 includes items and features similar to connector 102 described above, and similar or identical items or features are given the same reference numbers as those items and features described above. Connector 802 includes an actuator 804, which may serve as a retention element. In some implementations, the actuator 804 may include a motive element 806 and an extension member 808. Motive element 806 may be connected to the base 220, and the extension member 808 may connect to the bottom 218 of connector element 202, or vice versa. The motive element 806 of the actuator 804 may be activated to extend the connector element 202 into the extended position, and to retract the connector element 202 into the retracted position, as indicated by arrows 810 and 812.

In the example of FIG. 8, a proximity sensor 814 may be provided for sensing a proximity of the accessory wall 304 to which the external contact element 302 may be connected. For example, when the accessory wall 304 is placed in a particular position and within a predetermined distance or proximity with respect to the device 100, the proximity sensor 814 may detect the presence of the accessory wall 304, and send a signal to a processor 816, such as a central processing unit, logic circuit, or the like. The processor 816 may then determine whether to activate the actuator 804 for extending the connector element 202 into contact with the external contact element 302. In this example, the external contact 302 may not include the magnetic portion 306.

The actuator 804 may be any suitable type of actuator capable of extending and retracting the connector element 202. For example, the motive element 806 of the actuator 804 may include a solenoid, a shape memory alloy, an artificial muscle, a piezoelectric element, a fluid actuator, or other suitable motive element. Consequently, implementations herein are not limited to any particular type of actuator 804 or motive element 806. Further, while an individual motive element 806 is illustrated in this example, in other implementations, a single motive element 806 may serve as an actuator for multiple connector elements 202.

In some implementations, as discussed above in the example of FIG. 7, there may be multiple connectors 802 in the device 100. Consequently, based on inputs from one or more proximity sensors 814, the processor 816 may determine whether a particular one of the multiple connectors 802 is to be extended. For example, if each connector 802 has its own proximity sensor 814 associated therewith, then a particular accessory that only requires several of the connectors 802 may be designed trigger on the proximity sensor(s) 814 of a subset of connectors 802 that are used by the particular accessory.

Figure 9:
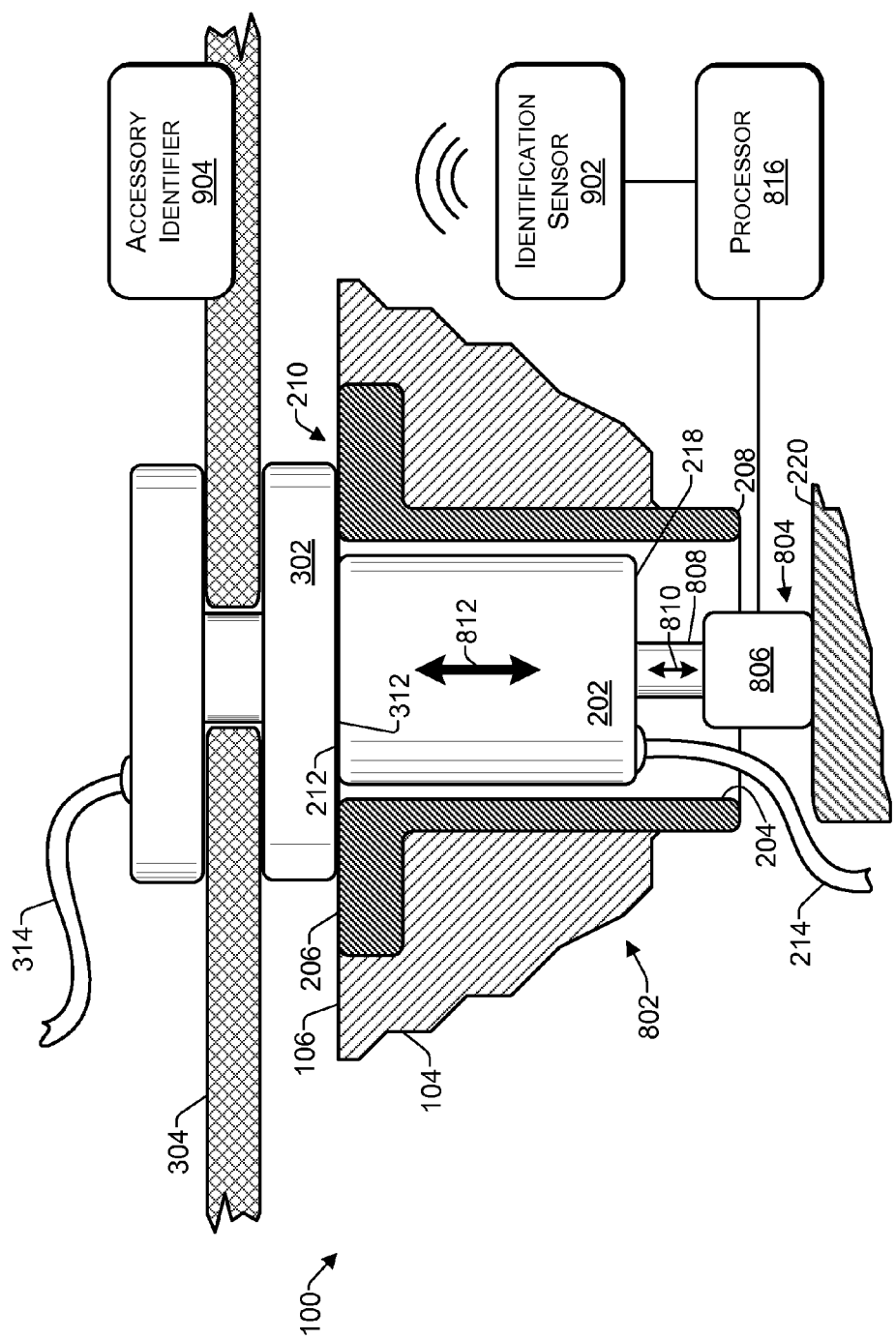
FIG. 9 is a cross-sectional elevation view of an electrical connector including an active extension arrangement and an identification sensor according to some implementations.

FIG. 9 is a cross-sectional elevation view of another example implementation of the electrical connector 802 including the active extension arrangement. In the illustrated example, the device 100 may include an identification sensor 902 for sensing an accessory identifier 904 associated with the external contact element 302. In some implementations, the identification sensor 902 may be a radiofrequency identification (RFID) sensor, and the accessory identifier 904 may be an RFID tag. As another example, the identification sensor 902 may be an optical sensor, and the accessory identifier may be a barcode, serial number, or the like.

The identification sensor 902 may detect that the accessory identifier 904 is located proximate to the connector 802. The processor 816 may receive this detection as an input signal, and in response may activate actuator 804 to extend the connector element 202 into contact with the external contact element 302. Furthermore, with the use of the an accessory identifier, the processor 816 may accurately identify the type of accessory or connection component being connected to and may determine which connector elements 202 out of multiple connector elements 202 to extend for making a connection. For example, a power adapter may only require two connector elements 802 for forming an electrical connection to transfer power, while a docking station may require extension of four or five connector elements 202 for making a connection able to transmit both data and power. Accordingly, a power adapter may have a different accessory identifier from a docking station.

Furthermore, in some implementations, both the identity sensor 902 and the proximity sensor 814 described above may be used for ensuring accuracy in sensing the presence and identity of a particular accessory. Additionally, while an RFID sensor and an optical sensor have been described as suitable identity sensors 902, numerous other identification techniques will be apparent to those of skill in the art in light of the disclosure herein. Thus, implementations herein are not limited to any particular identification technique.

Example Electronic Device Components

Figure 10:
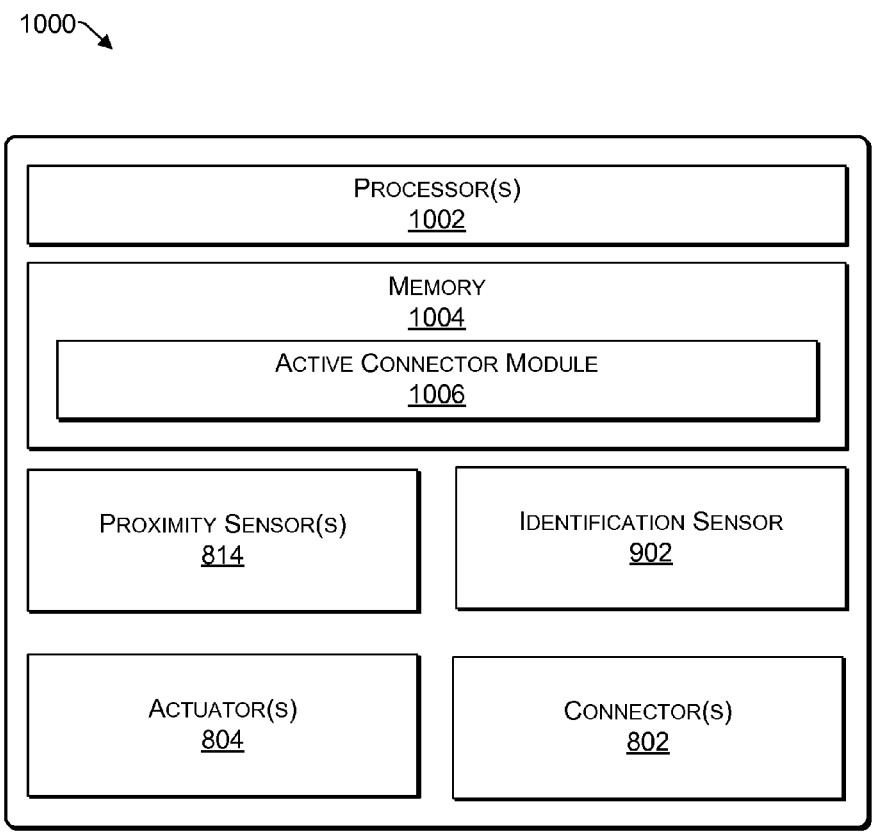
FIG. 10 is a block diagram illustrating selected example modules and components of an electronic device having automatic connectors according to some implementations.

FIG. 10 is a block diagram of select example components of an electronic device 1000 according to some implementations that may incorporate the connectors 802 described herein. In some implementations, the electronic device 1000 corresponds to the electronic device 100 described above, although in other implementations, the electronic device 100 does not necessarily include all the components illustrated in the example device 1000 of FIG. 10. In a very basic configuration, the electronic device 1000 includes or accesses components such as at least one processor 1002 and a memory 1004. Memory 1004 may store an active connector module 1006 that may determine when to extend one or more connectors 802 according to some implementations. Electronic device 1000 may further include the proximity sensor(s) 814 and/or the identification sensor 902 described above. For example, the active connector module 1006 executed on the processor 1002 may receive a signal from a proximity sensor 814 and/or the identity sensor 902 and make a determination as to whether to extend one or more of multiple connectors 802. In response to the determination, the active connector module 1006 executed on processor 1002 may send an activation signal to one or more of actuators 804 to extend one or more connector elements 204 of one or more selected connectors 802.

In some implementations, the active connector module 1006 and processor 1002 may simply be a logic circuit that receives an input signal and decides an appropriate output signal to provide to one or more of actuators 804. In other implementations, processor 1002 may be one or more microprocessors, microcomputers, microcontrollers, digital signal processors, central processing units, state machines, and/or other devices that manipulate signals based on operational instructions. Depending on the configuration of the electronic device 1000, the memory 1004 may be an example of non-transitory computer-readable media and may include volatile and nonvolatile memory, mass storage, or the like. For instance, the memory 1004 may include, but is not limited to, RAM, ROM, EEPROM, flash memory, solid-state drives, magnetic disks, or other memory or storage technology. Thus, the memory 1004 may include any medium that can be used to record or store computer-readable instructions and data that can be accessed by the electronic device 1000.

In some implementations, the active connector module 1006 may be one or more program modules considered in the general context of computer-executable instructions stored on computer-readable media, e.g., memory 1004, and executed by the processor 1002. Generally, program modules include routines, programs, objects, components, data structures, etc. for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Further, the example electronic device 1000 illustrated in FIG. 10 is just one non-limiting example of a suitable electronic device according to some implementations. Numerous other implementations, variations and configurations will be apparent to those of skill in the art in view of the disclosure herein. Accordingly, implementations of the connectors herein are not limited to use with any particular type of electronic device.

Example Process

Figure 11:
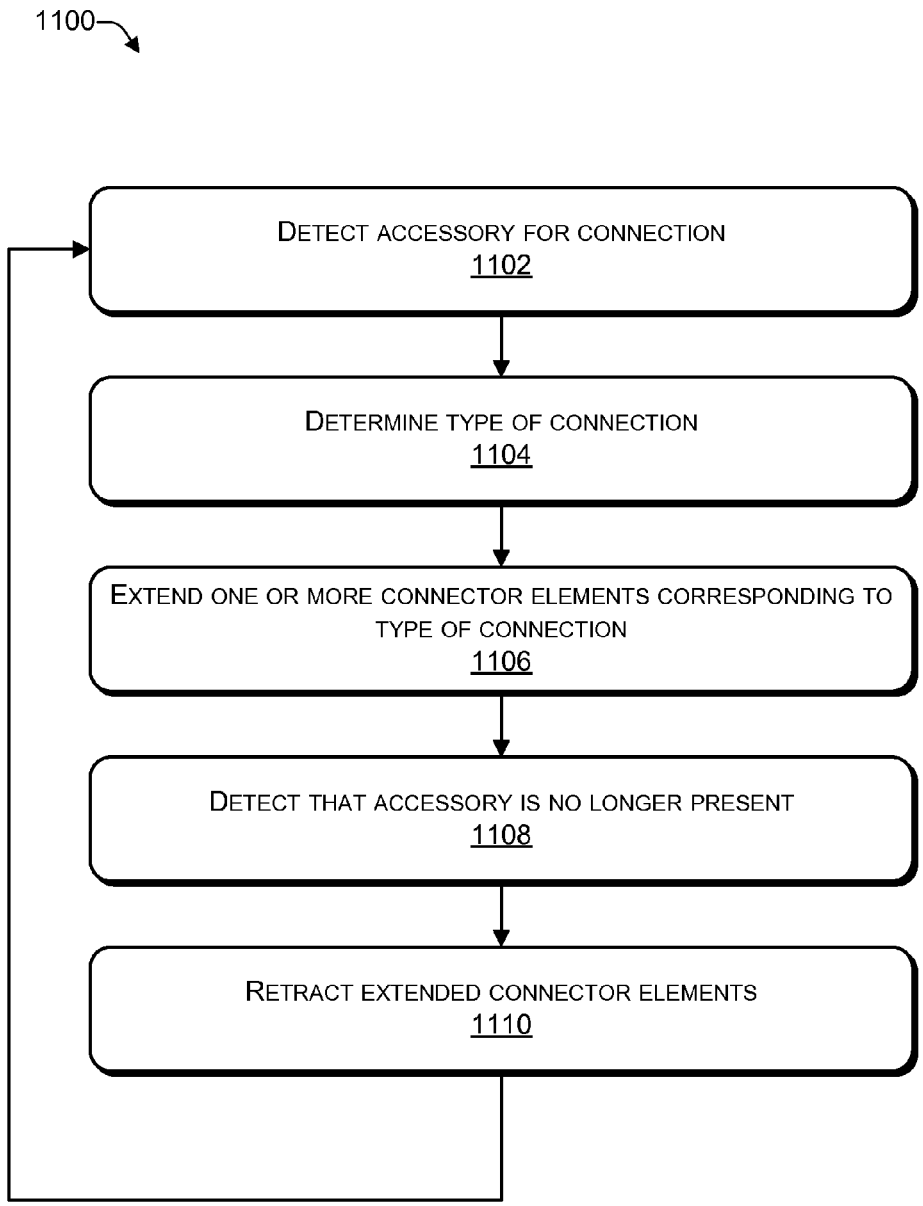
FIG. 11 is a flow diagram illustrating an example process of connector operation according to some implementations.

FIG. 11 illustrates an example process 1100 for implementing the techniques described above for activating one or more connectors 802. This process is illustrated as a logical flow diagram, each operation of which represents a sequence of operations that can be implemented in hardware, software, or a combination thereof. In the context of software, the operations represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. The process 1100 is described with reference to the connectors and electronic devices of FIGS. 8-10, although other connectors, electronic devices, apparatuses and systems may implement this process.

At block 1102, the device detects the presence of an accessory for connection. For example, a sensor on the device may detect that an external contact element is proximate to at least one extensible connector element as described herein. For instance, in some implementations, at least one of a proximity sensor and/or an identification sensor may detect the presence of the accessory.

At block 1104, the device may determine the type of connection to be made with the accessory. For example, the device may determine whether the accessory requires connection for transfer of power, data, or both power and data.

At block 1106, the device may extend one or more connector elements of one or more connectors corresponding to the type of connection to be made. For example, in some implementations, if the connection is for the transfer of power, two connector elements configured to transfer power may be extended into contact with corresponding external contact elements on the accessory. On the other hand, if the connection is for the transfer of data, a subset of the connector elements corresponding to data transfer may be extended into contact with corresponding external contact elements on the accessory. Further, if the connection is for the transfer of both power and data, connector elements corresponding to the transfer of both power and data may be extended for contacting with corresponding external contact elements on the accessory. As described above, a motive element may be provided for extending one or more selected connector elements into contact with corresponding external contact elements of the accessory.

At block 1108, the device may detect that the accessory is no longer present. For example, the device may be disengaged from the accessory, the accessory may be disconnected from the device, or the like.

At block 1110, the device may retract one or more extended connector elements. For example, one or more motive elements may be actuated to retract the one or more extended connector elements. In some instances, a retaining member, such as a spring, magnet or the like may serve to retract the one or more extended connector elements.

The example process 1100 of FIG. 11 may be a continual process, such that as subsequent accessories are engaged with the device, suitable connectors are extended. Further, the process 1100 is just one example process for discussion purposes. Numerous other variations will be apparent to those of skill in the art in light of the disclosure herein. Further, while the disclosure herein sets forth several examples of connector and actuator configurations for discussion purposes, implementations herein are not limited to any particular actuator, device, purpose or intended use.

Optical Connection

Figure 12:
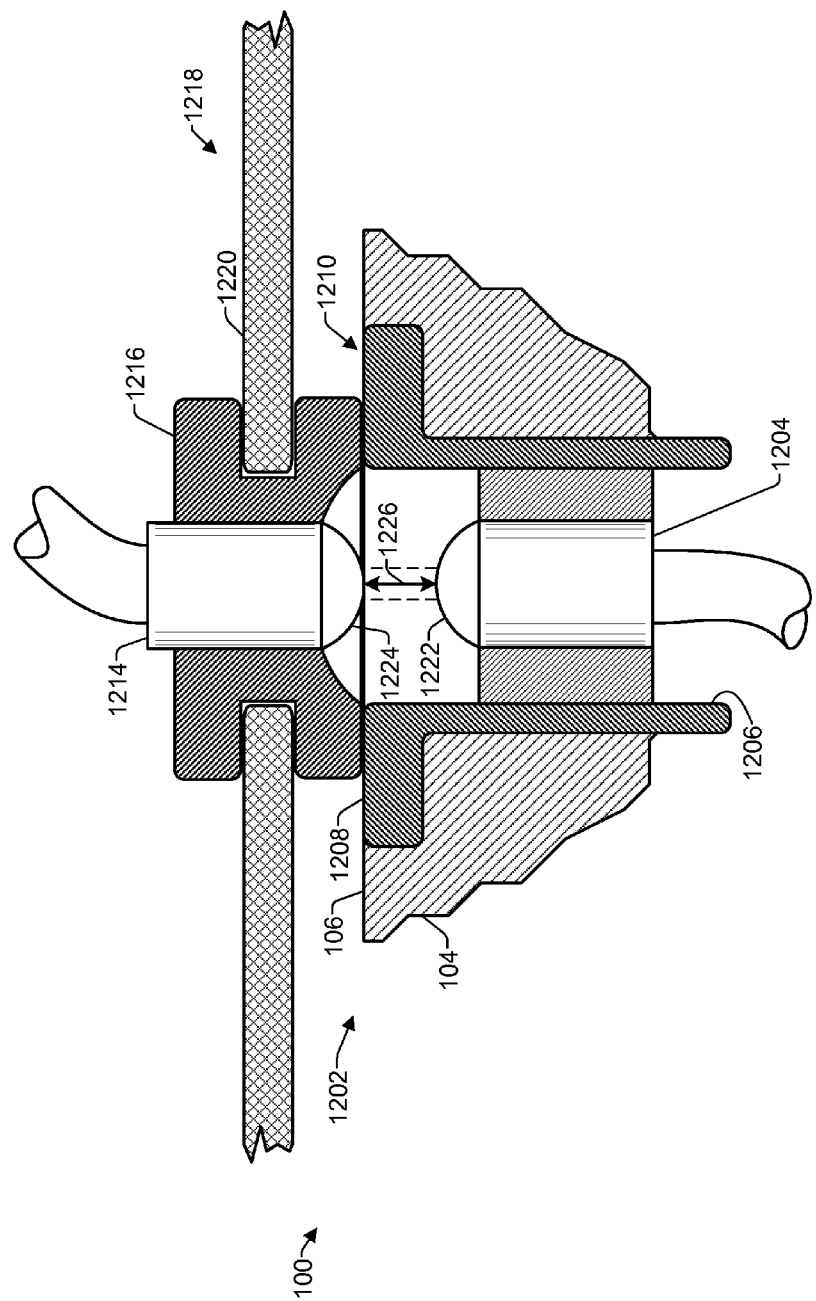
FIG. 12 is a cross-sectional elevation view of an optical connector according to some implementations.

FIG. 12 is a cross-sectional elevation view of an optical connector 1202 that may be used in place of or in addition to one or more of the electrical connectors 102, 502, 702 and/or 802. For example, the optical connector 1202 may transfer optical signals, which may include data, data packets, binary code, or other types of information. The optical connector 1202 may include a first optical module 1204 located within a hollow bore or cavity 1206. The cavity 1206 includes an exterior end 1208 that provides an opening through the device surface 106. The first optical module 1204 may be fixed at a predetermined distance from the exterior end 1208 such that the first optical module 1204 is recessed and protected within the cavity 1206. The cavity 1206 may be formed within a housing or enclosure 1210 for containing the first optical module 1204. Furthermore, in some implementations, the enclosure 1210 may be integrally molded or formed as part of the device housing 104. For example, in some implementations, a simple opening or hole formed in the device housing 104 may serve as the cavity 1206, and thus, the material of the device housing 104 may form the enclosure 1210.

A second optical module 1214 may be located in an external element 1216. For example, in some implementations, the second optical module 1214 may be contained in an accessory, second device, or other component 1218 that may be positioned proximate to the device 100, connected to the device 100, engaged with the device 100, or the like. For example, the external element 1216 may be mounted in a wall 1220 of the component 1218. The first optical module 1204 may include a first emitter and/or optical sensor 1222, and the second optical module 1214 may include a second emitter and/or optical sensor 1224. The first optical module 1204 and the second optical module 1214 may communicate with each other in at least one direction using optical signals 1226. Further, in some implementations, the first optical module 1204 and the second optical module 1214 may be configured for two-way optical communication between the device 100 and the component 1218. For example, each of the first and second optical modules 1204 and 1214, respectively, may include both an optical emitter for emitting optical signals 1226, and an optical sensor for receiving optical signals 1226.

In some implementations, when the external element 1216 is positioned proximate to the exterior end 1208 of the cavity 1206, the second optical module 1214 is positioned or aligned for optical connection and communication with the first optical module 1204. In some instances, the optical modules 1204, 1214 may be aligned as a result of the device 100 being engaged with or connected with the accessory or component 1218. For example, optical signals 1226 may be transferred between the first optical module 1204 and the second optical module 1214, such as for transferring data, data packets, voice information, or other information, signals, and so forth. As one example, referring to the implementation of FIG. 7 described above, one or more of the electrical connectors 706 may be replaced with one or more of the optical connectors 1202. In a particular implementation, there may be two electrical connectors 706 for transferring electrical power and one or more optical connectors 1202 for transferring data. Numerous other possible implementations will be apparent to those of skill in the art in view of the disclosure herein.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims

The invention claimed is:

1. A device comprising:
a device housing including a device surface;
a cavity formed in the device housing, the cavity having a lubricious non-conductive liner between an interior end of the cavity and an exterior end of the cavity, the cavity opening through the device surface at the exterior end of the cavity;
a cylindrical connector element moveable within the lubricious non-conductive liner of the cavity between a retracted position and an extended position, the connector element having a first side including a contact surface, and a second side, opposite to the first side, the second side connected to a retaining element, wherein:
in the retracted position, the contact surface is located at a predetermined distance from the exterior end of the cavity; and
in the extended position, the contact surface of the connector element is moved within the cavity into contact with an external contact element positioned proximate to the exterior end of the cavity to form an electrical connection between the connector element and the external contact element; and
a base at the interior end of the cavity, wherein:
the retaining element connected to the second side of the connector element is connected to the base; and
the base and the retaining element prevent the connector element from retracting into the cavity past the predetermined distance.

2. The device as recited in claim 1, wherein:
the connector element is constructed, at least in part, having a core of a ferromagnetic material and a conductive plating at least over the contact surface; and
the connector element is movable to the extended position under the influence of a magnetic field exerted from the external contact element to contact the external contact element for forming the electrical connection.

3. The device as recited in claim 2, wherein the external contact element includes a magnetic core for producing the magnetic field to move the connector element into the extended position to form the electrical connection.

4. The device as recited in claim 3, wherein the external contact element includes a permanent magnet as the magnetic core.

5. The device as recited in claim 3, wherein the external contact element includes an electromagnet as the magnetic core.

6. The device as recited in claim 1, wherein:
the external contact element is constructed, at least in part, from a ferromagnetic material;
the connector element includes a magnetic core and a conductive plating at least over the contact surface;
the connector element is movable to the extended position based, at least in part, on a magnetic field exerted by the magnetic core for attraction to the ferromagnetic material of the external contact element;
the contact surface of the connector element is a hemispherical contact surface; and
the external contact element includes a concave contact area to receive and center the hemispherical contact surface when the connector element moves to the extended position and into contact with the external contact element for forming the electrical connection.

7. The device as recited in claim 1, further comprising a mechanical actuator connected to the connector element that extends the connector element into contact with the external contact element when the external contact element is positioned proximate to the exterior end of the cavity.

8. The device as recited in claim 7, wherein:
the mechanical actuator comprises a linkage connected to the connector element; and
the external contact element comprises a depression element for pressing the linkage when the external contact element is proximate to the exterior end of the cavity, wherein pressing of the linkage extends the connector element into contact with the external contact element.

9. The device as recited in claim 1, further comprising an actuator having a motive element for extending the connector element into contact with the external contact element.

10. The device as recited in claim 9, further comprising a proximity sensor configured to send a signal to cause activation of the actuator in response to the proximity sensor detecting that the external contact element is proximate to the exterior end of the cavity.

11. The device as recited in claim 9, further comprising an identification sensor configured to send a signal to cause activation of the actuator in response to the identification sensor detecting an identifier associated with the external contact element.

12. The device as recited in claim 11, wherein there are a plurality of the cavities, each having a connector element able to engage with one of a plurality of external contact elements, and the device further comprising a processor configured to extend a first subset of the of the connector elements, based on the signal from the identification sensor, to form electrical connections with the plurality of external contact elements, while a second subset of the connector elements remains in a retracted position.

13. The device as recited in claim 9, wherein the motive element comprises at least one of a solenoid, an artificial muscle, a shape-memory alloy, a piezoelectric element, or a fluid actuator.

14. The device as recited in claim 1, wherein:
the device is configured to engage with an accessory including the external contact element to position the external contact element proximate to the exterior end of the cavity; and
engaging the device with the accessory causes the connector element to automatically extend to form the electrical connection between the connector element and the external contact element.

15. The device as recited in claim 14, wherein the accessory comprises at least one of: a device case, a device cover, a reading light, a docking station, a display device, an antenna, a supplemental antenna, an antenna booster, a power adaptor, or a supplemental battery.

16. The device as recited in claim 14, wherein:
the cavity is a first cavity, the device further comprising a first optical module recessed in a second cavity at a fixed distance from an exterior end of the second cavity, such that engaging the device with the accessory causes the first optical module to be aligned with a second optical module mounted in the accessory to form an optical connection between the first optical module and the second optical module; and
the first optical module is spaced at least the distance away from the second optical module following engaging of the device with the accessory.

17. A connector comprising:
an enclosure including a cylindrical cavity, the cavity having an interior end and an exterior end, the cavity having an opening at the exterior end;
a connector element within a bore of the cavity, the connector element having a contact surface, wherein:
the connector element is movable within the bore of the cavity from a retracted position within the cavity to an extended position for contacting the contact surface with an external contact element positioned proximate to the exterior end of the cavity;
the connector element comprises, at least in part, a core of a ferromagnetic material with a conductive outer coating at least at the contact surface; and
the external contact element includes a magnet that exerts a magnetic field on the core of the connector element for moving the contact surface of the connector element into contact with the external contact element when the external contact element is positioned proximate to the exterior end of the cavity;
a retaining element for retracting the connector element to the retracted position within the cavity when the external contact element is removed from proximity to the exterior end of the cavity; and
a base at the interior end of the cavity, wherein the base and the retaining element prevent the connector element from retracting into the cavity past the retracted position.

18. The connector as recited in claim 17, wherein:
the contact surface of the connector element is a hemispherical contact surface; and
the external contact element includes a concave contact area to receive and center the hemispherical contact surface of the connector element.

19. The connector as recited in claim 17, wherein:
the retaining element is a magnetic retaining element; and
a first magnetic attraction exerted by the magnet of the external contact element on the core of the connector element for moving the contact surface of the connector element into contact with the external contact element is greater than a second magnetic attraction exerted by the magnetic retaining element.

20. The connector as recited in claim 17, wherein:
the connector element is cylindrical or spherical;
the cavity includes a cylindrical lining of lubricious non-conducting material to insulate the connector element within the cavity and allow movement between the retracted position and the extended position.

21. An electronic device comprising:
a device housing including a device surface;
a cavity formed in the device housing, the cavity having an interior end and an exterior end, the cavity opening through the device surface at the exterior end of the cavity; and
a first optical module recessed within the cavity and fixed at a predetermined distance from the device surface, the first optical module forming an optical connection with a second optical module mounted in an external element of an accessory to the electronic device when the external element is positioned proximate to the exterior end of the cavity as a result of the electronic device being engaged with the accessory, wherein the first optical module is spaced at least the predetermined distance from the second optical module following engaging the electronic device with the accessory and the forming of the optical connection, and wherein the second optical module is positioned proximate to the exterior end of the cavity.

22. The electronic device as recited in claim 21, wherein the cavity is a first cavity, the electronic device further comprising at least one second cavity formed in the device housing, the second cavity opening through the device surface at an exterior end of the second cavity; and
a connector element located within the second cavity, the connector element having a contact surface, the connector element movable between a retracted position in which the contact surface is located at a predetermined distance from the exterior end of the second cavity, and an extended position for contacting the contact surface with an external contact element on the-accessory positioned proximate to the exterior end of the second cavity to form an electrical connection between the connector element and the external contact element as a result of the electronic device being engaged with the accessory.

23. The electronic device as recited in claim 22, wherein:
the connector element is constructed, at least in part, from a ferromagnetic material; and
the connector element is movable to the extended position under the influence of a magnetic field exerted from the external contact element.

24. The electronic device as recited in claim 22, wherein there are at least two second cavities and connector elements for transferring electrical power between the electronic device and the accessory, while the optical connection enables transfer of data.

25. The electronic device as recited in claim 22, further comprising a mechanical actuator connected to the connector element that extends the connector element into contact with the external contact element when the external contact element is positioned proximate to the exterior end of the second cavity.

26. The electronic device as recited in claim 22, further comprising an actuator having a motive element for extending the connector element into contact with the external contact element.

27. The electronic device as recited in claim 21, wherein the cavity is a first cavity, the electronic device further comprising:
at least one second cavity, the second cavity opening through the device surface at an exterior end of the second cavity;
a connector element located within the second cavity, the connector element having a contact surface, the connector element movable between a retracted position in which the contact surface is located at a predetermined distance from the exterior end of the second cavity, and an extended position for contacting the contact surface with an external contact element on the accessory positioned proximate to the exterior end of the second cavity to form an electrical connection between the connector element and the external contact element as a result of the electronic device being engaged with the accessory, wherein:
engaging the electronic device with the accessory by sliding the electronic device and the accessory together in a direction transverse to a bore of the cavity positions the external contact element proximate to the exterior end of the cavity and causes the connector element to extend to form the electrical connection between the connector element and the external contact element, and causes the first optical module to be aligned with a second optical module mounted in the accessory to form an optical connection between the first optical module and the second optical module.

28. The electronic device as recited in claim 27, wherein:
the contact surface of the connector element is a hemispherical contact surface; and
the external contact element includes a matching concave contact area to receive and center the hemispherical contact surface within the concave contact area.

29. The electronic device as recited in claim 27, further comprising a magnetic retaining element that exerts a magnetic field for retracting the connector element to the retracted position when the accessory is disengaged from the electronic device.

30. The electronic device as recited in claim 29, wherein the magnetic retaining element includes an electromagnet.

31. An electronic device comprising:
a device housing including a device surface;
a cavity formed in the device housing, the cavity having an interior end and an exterior end, the cavity opening through the device surface at the exterior end of the cavity, wherein a bore of the cavity includes a lining of lubricious non-conducting material between the interior end and the exterior end;
a connector element located within the cavity, the connector element having a contact surface, wherein
the connector element is movable within the lining of the cavity, under influence of a magnetic field, from a retracted position, in which the contact surface is located at a distance from the exterior end of the cavity, to an extended position in which the contact surface contacts an external contact element positioned proximate to the exterior end of the cavity to form an electrical connection between the connector element and the external contact element;
the connector element is constructed, at least in part, having a core of a ferromagnetic material with a conductive outer coating at least at the contact surface; and
the magnetic field is exerted by a magnetic core of the external contact element; and
a retaining element for retracting the connector element to the retracted position when the external contact element is removed from proximity to the exterior end of the cavity.

32. The electronic device as recited in claim 31, wherein:
the retaining element is magnetic; and
a first magnetic field exerted by the external contact element is greater than a second magnetic field exerted by the magnetic retaining element.

33. The electronic device as recited in claim 31, wherein the retaining element is a coil spring, the electronic device further comprising a base at the interior end of the cavity, wherein the base and the coil spring prevent the connector element from retracting into the cavity past the predetermined distance.

34. The electronic device as recited in claim 31, wherein:
the contact surface of the connector element is a hemispherical contact surface; and
the external contact element includes a matching concave contact area to receive and center the hemispherical contact surface within the concave contact area.

35. The electronic device as recited in claim 31, wherein:
the electronic device is configured to engage with an accessory including the external contact element to position the external contact element proximate to the exterior end of the cavity; and
engaging the electronic device with the accessory causes the connector element to automatically extend from the retracted position to form the electrical connection between the connector element and the external contact element.

36. The electronic device as recited in claim 31, wherein:
the cavity is a first cavity, the electronic device further comprising a first optical module mounted in a second cavity fixed at a distance from an exterior end of the second cavity, the first optical module positioned for alignment with a second optical module mounted in an external element when the external element is positioned proximate to the exterior end of the second cavity to form an optical connection between the first optical module and the second optical module; and the first optical module is spaced at least the distance from the second optical module following positioning of the second optical module proximate to the exterior end of the second cavity.

37. The electronic device as recited in claim 36, wherein the electronic device is configured to engage with an accessory including the external contact element and the second optical module to position the external contact element proximate to the exterior end of the first cavity and the external element proximate to the exterior end of the second cavity when the electronic device is engaged with the accessory.

* * * * *